US 9,175,566 B2

(12) United States Patent
Xu et al.

(10) Patent No.: US 9,175,566 B2
(45) Date of Patent: Nov. 3, 2015

(54) GAS TURBINE ENGINE PRESWIRLER WITH ANGLED HOLES

(71) Applicant: Solar Turbines Incorporated, San Diego, CA (US)

(72) Inventors: Hongzhou Xu, San Diego, CA (US); Michael D. Fox, San Diego, CA (US); Scott L. Stafford, San Diego, CA (US); Edward T. Ramirez, San Diego, CA (US)

(73) Assignee: Solar Turbines Incorporated, San Diego, CA (US)

( * ) Notice: Subject to any disclaimer, the term of this patent is extended or adjusted under 35 U.S.C. 154(b) by 516 days.

(21) Appl. No.: 13/627,974

(22) Filed: Sep. 26, 2012

(65) Prior Publication Data
US 2014/0083101 A1    Mar. 27, 2014

(51) Int. Cl.
*F01D 5/08* (2006.01)
*F02C 7/18* (2006.01)

(52) U.S. Cl.
CPC . *F01D 5/082* (2013.01); *F02C 7/18* (2013.01); *F05D 2250/38* (2013.01); *F05D 2260/14* (2013.01); *F05D 2260/941* (2013.01); *Y10T 29/49* (2015.01); *Y10T 29/49995* (2015.01)

(58) Field of Classification Search
CPC  F01D 5/082; F05D 2260/14; F05D 2260/941
USPC ........................ 415/115, 116, 199.5
See application file for complete search history.

(56) References Cited

U.S. PATENT DOCUMENTS

| 4,113,406 | A | | 9/1978 | Lee et al. |
|---|---|---|---|---|
| 4,178,129 | A | * | 12/1979 | Jenkinson ................ 416/95 |
| 4,456,427 | A | * | 6/1984 | Evans et al. ............. 416/95 |
| 4,674,955 | A | | 6/1987 | Howe et al. |
| 5,984,630 | A | | 11/1999 | Di Salle et al. |
| 7,341,429 | B2 | | 3/2008 | Montgomery et al. |
| 7,520,719 | B2 | | 4/2009 | Janke et al. |
| 7,950,897 | B2 | | 5/2011 | Kizuka et al. |
| 8,066,482 | B2 | | 11/2011 | Strohl et al. |
| 2002/0028136 | A1 | * | 3/2002 | Briesenick et al. ......... 415/116 |
| 2007/0271930 | A1 | | 11/2007 | Takaoka et al. |
| 2010/0275612 | A1 | | 11/2010 | Smoke et al. |
| 2011/0162387 | A1 | | 7/2011 | Chir et al. |
| 2011/0247347 | A1 | * | 10/2011 | Ebert et al. ............... 60/806 |
| 2011/0274536 | A1 | | 11/2011 | Inomata et al. |

* cited by examiner

*Primary Examiner* — Ninh H Nguyen
(74) *Attorney, Agent, or Firm* — Procopio, Cory, Hargreaves & Savitch LLP (57) ABSTRACT

A gas turbine engine preswirler (470) includes an outer ring (471) and an inner ring (472). The inner ring (472) includes a plurality of angled holes (490). Each angled hole (490) follows a vector which is angled in at least one plane. A component of the vector is located on a plane perpendicular a radial from an axis of the preswirler (470). The component of the angle is angled relative to an axial direction of the preswirler (470).

19 Claims, 6 Drawing Sheets

GAS TURBINE ENGINE PRESWIRLER WITH ANGLED HOLES

TECHNICAL FIELD

The present disclosure generally pertains to as turbine engines, and is more particularly directed toward a preswirler with angled holes configured for cooling downstream components.

BACKGROUND

Gas turbine engines include compressor, combustor, and turbine sections. Portions of a gas turbine engine are subject to high temperatures. In particular, the first stage of the turbine section is subject to such high temperatures that the first stage is cooled by an directed through internal cooling passages from the compressor. In one such passage, air is directed through the diaphragm of a gas turbine engine and into the preswirler. Uncontrolled cooling air may lead to a loss of efficiency and improper cooling.

U.S. Pat. No. 7,341,429 to J. Montgomery, discloses a method of manufacturing a gas turbine engine includes providing a turbine mid-frame, coupling a plurality of rotor blades to a rotor disk, the rotor disk is coupled axially aft from the turbine mid-frame such that a cavity is defined between the rotor disk and the turbine mid-frame, and forming at least one opening extending through the turbine mid-frame to facilitate channeling cooling air into the gap, the opening configured to impart a high relative tangential velocity into the cooling air discharged from the opening.

The present disclosure is directed toward overcoming one or more of the problems discovered by the inventors.

SUMMARY OF THE DISCLOSURE

A gas turbine engine preswirler includes an outer ring and an inner ring. The inner ring includes a plurality of angled holes. Each angled hole follows a vector which is angled in at least one plane. A component of the vector is located on a plane perpendicular a radial from an axis of the preswirler. The component of the angle is angled relative to the axial direction of the preswirler.

A method for forming a preswirler is also provided. The method includes forming an angled hole through the preswirler at an angle from twenty to eighty-five degrees relative to an axial direction of the preswirler. The method also includes forming a first stress relief region contiguous the angled hole. The first stress relief region is configured to be in flow communication with the angled hole.

DETAILED DESCRIPTION

The systems and methods disclosed herein include a gas turbine engine preswirler with angled holes. In embodiments, the preswirler may be configured to provide a predictable amount of cooling air to the next stage turbine rotor disk and dampers aft of the preswirler. The angled holes can be configured to swirl the cooling air such that the angular velocity of the cooling air matches the angular velocity of the next stage turbine rotor disk. Matching the angular velocity of the cooling air with the angular velocity of the turbine rotor disk can reduce any temperature increases or pressure drops in the cooling air, which can result in an increase in efficiency.

Figure 1:
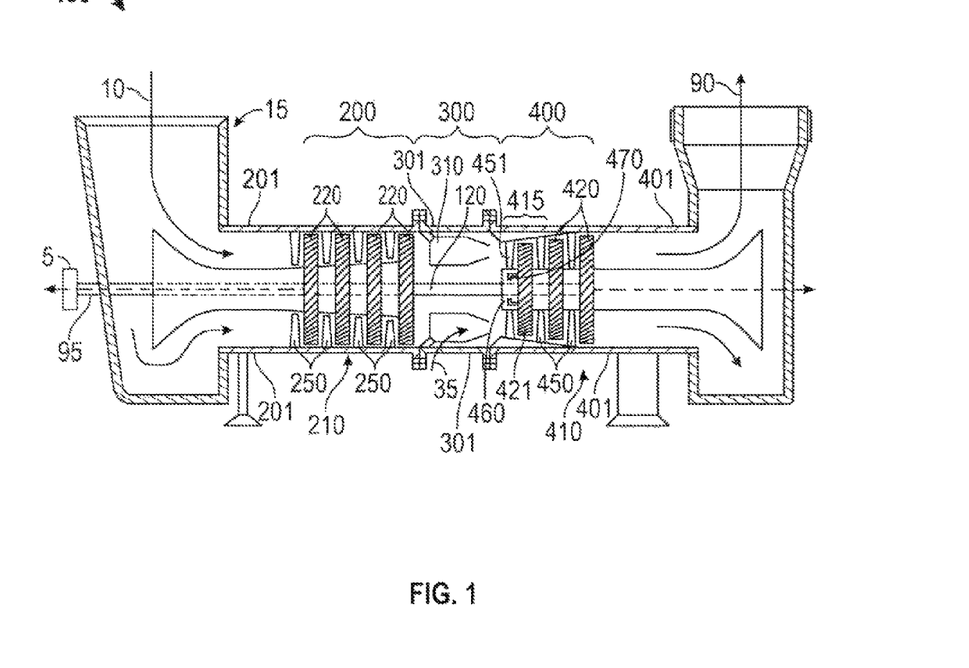
FIG. 1 is a schematic illustration of an exemplary gas turbine engine.

FIG. 1 is a schematic illustration of an exemplary gas turbine engine. A gas turbine engine 100 typically includes a compressor 200, a combustor 300, a turbine 400, and a shaft 120. The gas turbine engine 100 may have a single shaft or a dual shaft configuration. For convention in this disclosure all references to radial, axial, and circumferential directions and measures refer to center axis 95 unless otherwise specified. Center axis 95 may generally be defined by the longitudinal axis of shaft 120. Center axis 95 may be common to or shared with other gas turbine engine concentric components.

Air 10 enters an inlet 15 as a "working fluid" and is compressed by the compressor 200. Fuel 35 is added to the compressed air in the combustor 300 and then ignited to produce a high energy combustion gas. Energy is extracted from the combusted fuel/air mixture via the turbine 400 and is typically made usable via a power output coupling 5. The power output coupling 5 is shown as being on the forward side of the gas turbine engine 100, but in other configurations it may be provided at the aft end of gas turbine engine 100. Exhaust 90 may exit the system or be further processed (e.g., to reduce harmful emissions or to recover heat from the exhaust 90).

The compressor 200 includes a compressor rotor assembly 210 and compressor stationary vanes ("stators") 250. The compressor rotor assembly 210 mechanically couples to shaft 120. As illustrated, the compressor rotor assembly 210 is an axial flow rotor assembly. The compressor rotor assembly 210 includes one or more compressor disk assemblies 220. Each compressor disk assembly 220 includes a compressor rotor disk that is circumferentially populated with compressor rotor blades. Stators 250 axially precede each of the compressor disk assemblies 220.

The turbine 400 includes a turbine rotor assembly 410 and turbine nozzle assemblies 450. The turbine rotor assembly 410 mechanically couples to the shaft 120. As illustrated, the turbine rotor assembly 410 is an axial flow rotor assembly. The turbine rotor assembly 410 includes one or more turbine disk assemblies 420. Each turbine disk assembly 420 includes a turbine rotor disk that is circumferentially populated with turbine rotor blades 425 (shown in FIG. 2). Turbine nozzle assemblies 450 axially precede each of the turbine disk assemblies 420. The turbine nozzle assemblies 450 have circumferentially distributed turbine nozzle vanes. The turbine nozzle vanes helically reorient the combustion gas that is delivered to the turbine rotor blades 425 where the energy in the combustion gas is converted to mechanical energy and rotates the shaft 120.

A turbine nozzle assembly 450 paired with a turbine disk assembly 420 it precedes is considered a turbine stage of the gas turbine engine 100. A turbine first stage 415 is a stage axially adjacent to the combustor 300. The turbine first stage 415 includes a first stage turbine nozzle assembly 451 and a first stage turbine disk assembly 421. The first stage turbine nozzle assembly 451 includes diaphragm 460, preswirler 470, and turbine nozzles 455 (shown in FIG. 2).

The various components of the compressor 200 are housed in a compressor case 201 that may be generally cylindrical.

The various components of the combustor 300 and the turbine 400 are housed, respectively, in a combustor case 301 and a turbine case 401.

Figure 2:
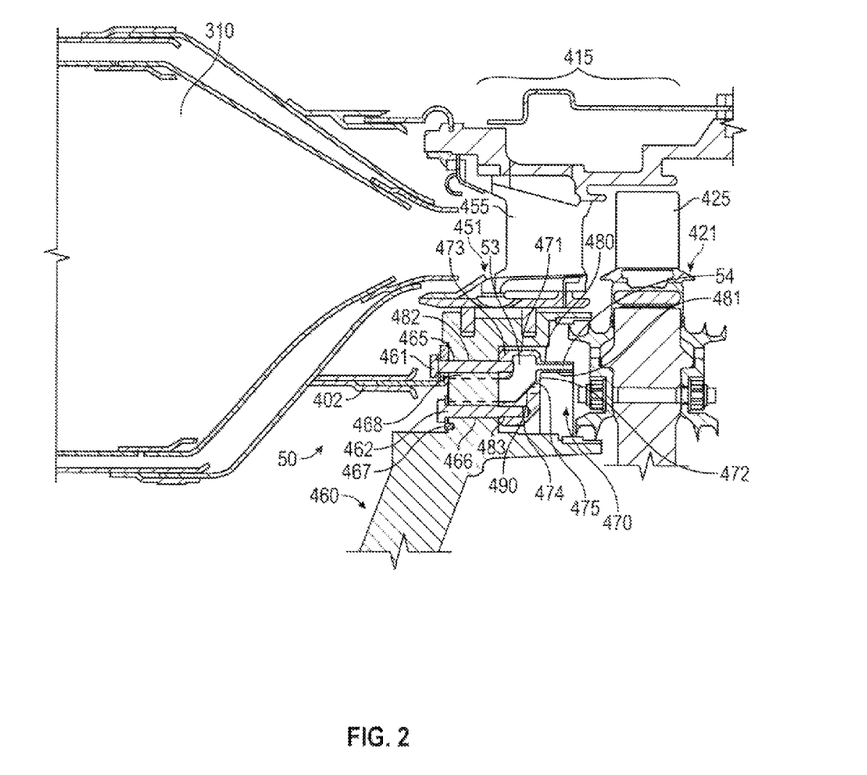
FIG. 2 is a cross-sectional view of a portion of a turbine first stage of a gas turbine engine.

FIG. 2 is a cross-sectional view of a portion of the turbine first stage 415 of FIG. 1. All references to radial, axial, and circumferential directions and measures for elements of preswirler 470 refer to the axis of preswirler 470, which is concentric to center axis 95. The axial direction 99 (illustrated in FIG. 4) of the preswirler 470 being the direction traveling from the forward or upstream side of the preswirler 470 to the aft or downstream side of the preswirler 470 along a path concentric or parallel to the axis of the preswirler 470. The first stage turbine nozzle assembly 451 is adjacent to the combustion chamber 310. Cooling air from the compressor 200 travels along path for cooling air 50 to the first stage turbine nozzle assembly 451, passes through the diaphragm 460, and into the preswirler 470. The preswirler 470 redirects the cooling air and imparts a tangential component to the velocity of the cooling air. The tangential component to the velocity of the cooling air may match the angular velocity of the first stage turbine disk assembly 421. The described arrangement may also be used in other stages.

The preswirler 470 includes an outer ring 471 and an inner ring 472 defining a passage for cooling air 53 there between. The outer ring 471 may include an outer flange 473 and an outer cylindrical portion 480. The outer flange 473 may be thickened and may be configured to include first holes 482 (only one is visible in FIG. 2; see FIGS. 3 and 5). The outer cylindrical portion 480 may extend aft from the aft end of the outer flange 473.

Figure 3:
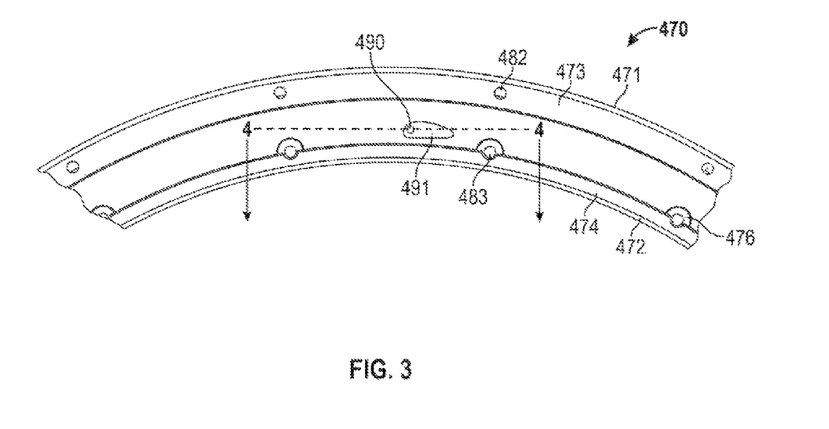
FIG. 3 is an elevation view of an upper portion of a preswirler.

FIG. 3 is an elevation view of an upper portion of the preswirler 470 of the first stage turbine nozzle assembly 451. Referring now to FIG. 2 and FIG. 3, the inner ring 472 is located radially inward from the outer ring 471. The inner ring 472 of the preswirler 470 may include an inner flange 474, an inner cylindrical portion 481, and a back portion 475 as shown in FIG. 2. The inner ring 472 may also include angled holes 490 and first stress relief region 491 as shown in FIG. 3, as well as second stress relief region 492 (shown in FIG. 4). Inner flange 474 may be spaced apart from the outer flange 473. The inner flange 474 may be thickened as shown in FIG. 2 and may be configured to include second holes 483 (only one is visible in FIG. 2; see FIGS. 3 and 5). In the embodiment shown in FIG. 3, inner ring 472 includes bosses 476. Each boss 476 includes a second hole 483.

Referring again to FIG. 2, the inner cylindrical portion 451 may be located radially inward and within the outer cylindrical portion 480. Inner cylindrical portion 481 and outer cylindrical portion 480 may define a radial gap 54 there between. Swirl vanes may span radial gap 54 from inner cylindrical portion 481 to outer cylindrical portion 480. Swirl vanes may be angled relative to the axis of the preswirler 470. The back portion 475 may extend radially outward from the aft end of the inner flange 474 to the forward end of the inner cylindrical portion 481. Back portion 475 may also extend axially aft from inner flange 474 to inner cylindrical portion 481.

Angled holes 490 may be formed in the inner ring 472 of preswirler 470. In the embodiment shown in FIG. 2, angled holes 490 are formed in back portion 475.

The diaphragm 460 has a mounting portion 468 with diaphragm cooling passages. The mounting portion 468 includes outer diameter holes 465 and inner diameter holes 466. Outer diameter holes 465 align with first holes 482 and inner diameter holes 466 align with second holes 483.

The preswirler 470 may be mounted to the diaphragm 460 by a plurality of outer diameter couplers 461 and a plurality of inner diameter couplers 462. Each first hole 482 may receive an outer diameter coupler 461 and each second hole 483 may receive an inner diameter coupler 462. An outer diameter coupler 461 passes through an outer diameter 465 and into a first hole 482. An inner diameter coupler 462 passes through an inner diameter hole 466 and into a second hole 483. The preswirler 470 configured for mounting to the diaphragm 460 may be configured with at least ten first holes 482 and at least ten second holes 483 to sufficiently seal the preswirler 470 to the diaphragm 460 and prevent uncontrolled leakage.

In one embodiment, the outer diameter couplers 461, outer diameter holes 465, and first holes 482 each total eighteen, while the inner diameter couplers 462, inner diameter holes 466, and second holes 483 also each total eighteen. However, any number of outer diameter couplers 461, outer diameter holes 465, first holes 482, inner diameter couplers 462, inner diameter holes 466, and second holes 483 may be used. The outer diameter couplers 461 may secure the inner turbine seal 402 to the diaphragm 460. In one embodiment the outer diameter couplers 461 and the inner diameter couplers 462 may be bolts. Alternative couplers such as rivets may also be used. The first holes 482 and the second holes 483 may be threaded. Some embodiments that encompass bolting the preswirler 470 to the diaphragm 460 do not include a press fit or an interference fit between the preswirler 470 and the diaphragm 460.

Figure 4:
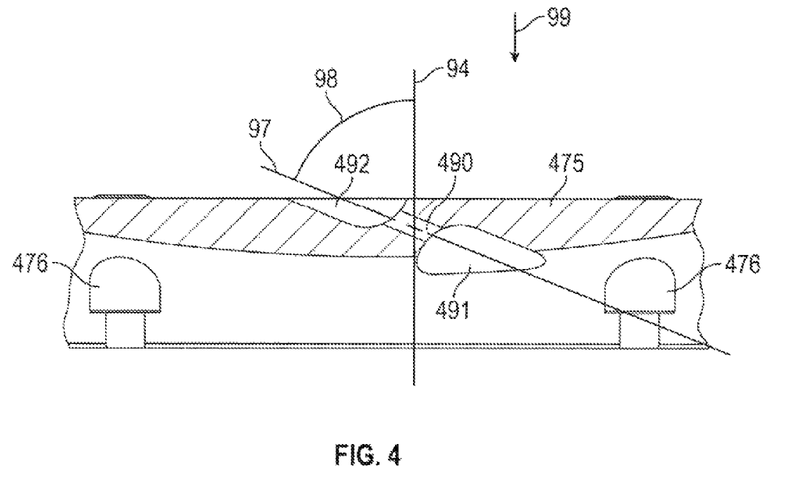
FIG. 4 is a cross-sectional view of a portion of the preswirler of FIG. 3 taken along line 4-4 with a direction of sight indicated by the arrows.

FIG. 4 is a cross-sectional view of the preswirler shown in FIG. 3. The preswirler depicted in FIG. 4 may be used in the gas turbine engine 100 of FIG. 1. As previously mentioned, angled holes 490 may be formed in inner ring 472. In the embodiment shown in FIG. 4, angled holes 490 are formed in back portion 475. Angled holes 490 follow a vector which is angled in at least one plane. A component of this vector, line 97, may be located on a plane perpendicular to a radial extending from the axis of the preswirler 470 and may be angled relative to the axial direction 99 of the preswirler 470 illustrated by angle 98, the angle between lines 94 and 97 in FIG. 4. Line 94 is a reference line located on the plane perpendicular to the radial extending from the axis of preswirler 470 and is oriented in axial direction 99. Line 97 may also be in the turbine rotor disk rotational direction to direct the gas or air in the same rotational direction as the turbine rotor disk. In one embodiment, angle 98 is from twenty to eighty-five degrees. In another embodiment, angle 98 is from sixty-five to eighty degrees. In another embodiment, angle 98 is sixty-eight degrees. In yet another embodiment, angle 98 is seventy-five degrees. The diameter of angled holes 490 may be sized based on the cooling flow needed. In one embodiment, the diameter of each angled hole 490 taken at a cross-section normal to the angled hole 490 is sized from 1/8" to 3/16". In another embodiment, the diameter of each angled hole 490 taken at a cross-section normal to the angled hole 490 is 0.136".

A first stress relief region 491 may be formed contiguous each angled hole 490. Each first stress relief region 491 is in flow communication with the angled hole 490. Each first stress relief region 491 may be an elongated recess and may recede into inner ring 472 thereby widening the opening of the angled hole 490. Each first stress relief region 491 may have an angle similar to the angle of the contiguous angled hole 490. Each first stress relief region 491 may have a curved profile and may include multiple curves, arcs, or radii. First stress relief region 491 may be an elongated scoop. The scoop may be wider than the diameter of angled hole 490. The elongated length of the scoop may be biased away from angled hole 490 along line 97, as illustrated in FIG. 4. In one embodiment, each first stress relief region 491 is located upstream of an angled hole 490 and recedes axially aft into inner ring 472. In another embodiment each first stress relief region 491 is located downstream of an angled hole 490 and recedes axially forward into inner ring 472.

A second stress relief region 492 may be formed contiguous each angled hole 490. Each second stress relief region 492 is in flow communication with the angled hole 490. Each second stress relief region 492 may be an elongated recess and may recede into inner ring 472 thereby widening the opening of the angled hole 490. Each second stress relief region 492 may have an angle similar to the angle of the contiguous angled hole 490. Each second stress relief region 492 may have a curved profile and may include multiple curves, arcs, or radii. Second stress relief region 492 may be an elongated scoop. The scoop may be wider than the diameter of angled hole 490. The elongated length of the scoop may be biased away from angled hole 490 along line 97, as illustrated in FIG. 4. In one embodiment, each second stress relief region 492 is located downstream of an angled hole 490 opposite an upstream first stress relief region 491. The second stress relief region 492 recedes axially forward into inner ring 472. In another embodiment, each second stress relief region 492 is located upstream of an angled hole 490 opposite a downstream first stress relief region 491. The second stress relief region 492 recedes axially aft into inner ring 472.

Each first stress relief region 491 and second stress relief region 492 may be formed by manufacturing processes such as ball milling, electrical discharge machining, or drilling.

The preswirler 470 depicted in FIG. 3 and FIG. 4 has a reformed connection. Inner ring 472 includes a plurality of bosses 476. Each boss 476 may be a thickened material and may be configured to receive an inner diameter coupler 462 for mounting the preswirler 470 to the diaphragm 460. A second hole 483 is machined into each boss 476.

Figure 5:
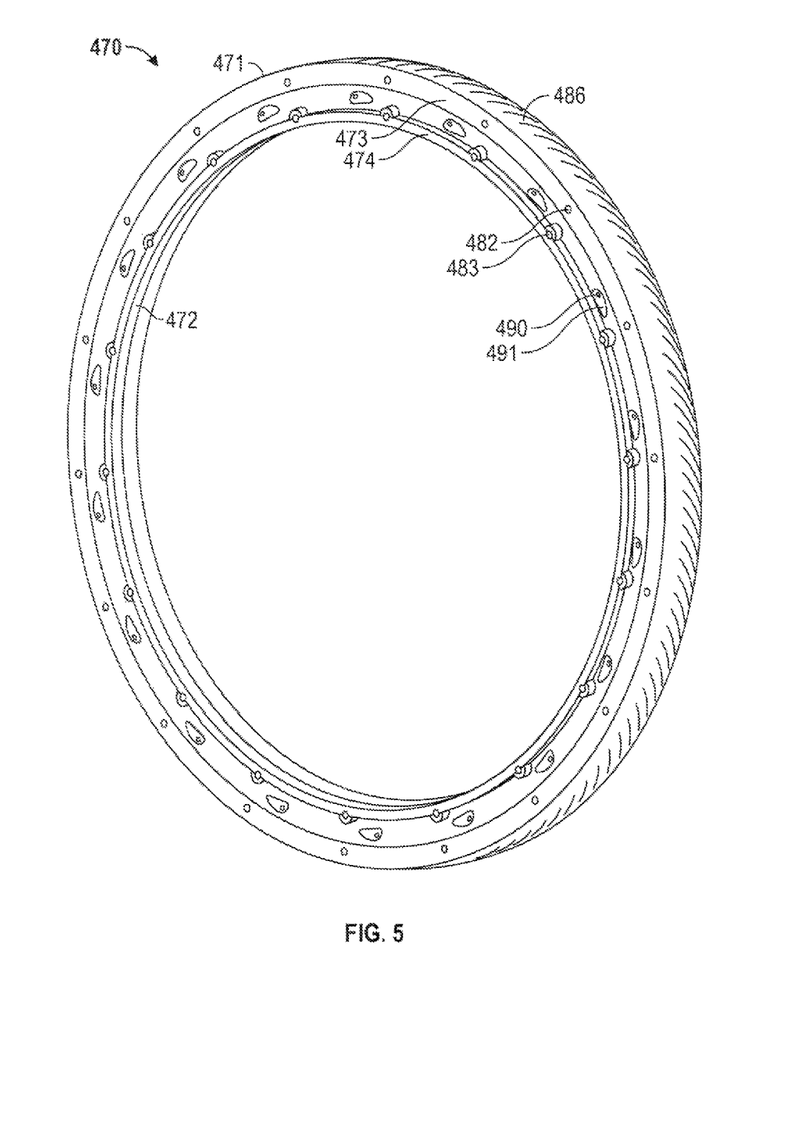
FIG. 5 is a perspective view of a preswirler.

FIG. 5 is a perspective view of the preswirler 470. The preswirler 470 of FIG. 5 may be used in the gas turbine engine 100 of FIG. 1. The preswirler 470 includes an outer ring 471 with a plurality of first holes 482. The outer ring 471 also includes a plurality of cooling holes 486. At least a portion of the cooling air entering radial gap 54 (depicted in FIG. 2) exits the preswirler 470 through the cooling holes 486. The preswirler 470 also includes an inner ring 472 with a plurality of second holes 483.

Preswirler 470 may include any number of angled holes 490. In one embodiment preswirler 470 includes from nine to eighteen angled holes 490. In another embodiment preswirler 470 includes nine angled holes 490. In yet another embodiment preswirler 470 includes eighteen angled holes 490. In the embodiment depicted in FIG. 5, the preswirler 470 includes the same number of first holes 482, second holes 483, and angled holes 490. At least a portion of the cooling it entering the preswirler 470 exits the preswirler 470 through the angled holes 490.

One or more of the above components (or their subcomponents) may be made from stainless steel and/or durable, high temperature materials known as "superalloys". A superalloy, or high-performance alloy, is an alloy that exhibits excellent mechanical strength and creep resistance at high temperatures good surface stability, and corrosion and oxidation resistance. Superalloys may include materials such as HASTELLOY, INCONEL, WASPALOY, RENE alloys, HAYNES alloys, INCOLOY, MP98T, TMS alloys, and CMSX single crystal alloys.

INDUSTRIAL APPLICABILITY

Gas turbine engines may be suited for any number of industrial applications such as various aspects of the oil and gas industry (including transmission, gathering, storage, withdrawal, and lifting of oil and natural gas), the power generation industry, cogeneration, aerospace and other transportation industries.

Operating efficiency of a gas turbine engine generally increases with a higher combustion temperature. Thus, there is a trend in gas turbine engines to increase the temperatures. Gas reaching a turbine first stage 415 from a combustion chamber 310 may be 1000 degrees Fahrenheit or more. To operate at such high temperatures a portion of the compressed air of the compressor 200 of the gas turbine engine 100 may be diverted through internal passages or chambers to cool the turbine rotor blades 425 in the turbine first stage 415.

The gas reaching the turbine rotor blades 425 in the turbine first stage 415 may also be under high pressure. The cooling air diverted from the compressor 200 may need to be at compressor discharge pressure to effectively cool turbine rotor blades 425 in the turbine first stage 415 and other components of the turbine 400. Gas turbine engine 100 components containing the internal passages for the cooling air such as a diaphragm 460 and a preswirler 470 may be subject to elevated levels of stress.

Cooling air with a substantially axial flow is diverted from the compressor discharge to a path for cooling air 50. The cooling air passes through the diaphragm cooling passage and into the preswirler 470 passage for cooling air 53. A portion of the cooling air may be directed radially outward and into radial gap 54. The cooling air from radial gap 54 may be discharged from the preswirler 470 with a tangential component from an aft end of radial gap 54 or from cooling holes 486 and into the first stage turbine disk assembly 421 with a tangential component that matches the angular velocity of the first stage turbine disk assembly 421.

A matching angular velocity between the cooling air and the first stage turbine disk assembly 421 may be desirable because it may prevent the first stage turbine disk assembly 421 from increasing the velocity of the cooling air. An increase in velocity of the cooling air would result in an increase in temperature and a pressure drop in the cooling air, which may reduce the effectiveness of the cooling air in cooling the first stage turbine disk assembly 421. An increase in velocity of the cooling air may also result in a loss in efficiency due to the work imparted by the first stage turbine disk assembly 421 on the cooling air to change the velocity of the cooling air. Once the cooling air passes into the first stage turbine disk assembly 421 the cooling air cools the first stage turbine disk assembly 421 including the turbine rotor blades 425.

It was discovered through research and testing that a preswirler connected to a diaphragm by a press fit or an interference fit, and a plurality of mounting bolts located near the outside diameters of a preswirler and a diaphragm may deform due to the temperature, pressure, and forces of the cooling air. This deformation to the various components may permit an uncontrolled leakage of cooling air to components aft of a preswirler in the gas turbine engine such as the next stage turbine rotor disk and dampers.

In order to control the flow of cooling air to the next stage turbine rotor disk and dampers, a seal between the diaphragm 460 and the preswirler 470 may need to be maintained to prevent cooling air from leaking and a path for cooling air may need to be added to properly cool components aft of the preswirler 470. It was determined through research, computer modeling, and testing that a more rigid connection may prevent deformation of the preswirler and the subsequent uncontrolled leakage.

A more rigid connection may be formed by constraining the preswirler 470 and the diaphragm 460 by a plurality of outer diameter couplers 461 and a plurality at inner diameter couplers 462. The outer diameter couplers 461 are placed through the outer diameter holes 465 and into the first holes 482 in the outer flange 473. The inner diameter couplers 462 are placed through the inner diameter holes 466 and into the second holes 483 of the inner ring 472. This more rigid may increase the contact area between the preswirler 470 and the diaphragm 460 which may reduce stress and wear of various gas turbine engine components.

With the use of angled holes 490 the amount of cooling air reaching the next stage turbine rotor disk and dampers may be predicted. It was further determined that angled holes 490 may provide a controlled flow of cooling air to the components aft of the preswirler 470 in the gas turbine engine 100. A portion the cooling air entering the passage for cooling air 53 may exit the preswirler through angled holes 490. A skewed angle of angled holes 490 may help generate a circumferential swirl in the cooling air exiting through angled holes 490 with a velocity that matches the preswirler 470 exit swirl velocity generated by the swirl vanes. Matching the preswirler 470 exit swirl velocity may prevent temperature increases and pressure losses in the cooling air which may lead to a more efficient use of the cooling air.

The skewed angles of angled holes 490 may lead to increased stress in regions of the preswirler 470. It was determined that first stress relief region 491 and second stress relief region 492 may reduce stress concentrations in preswirler 470.

Figure 6:
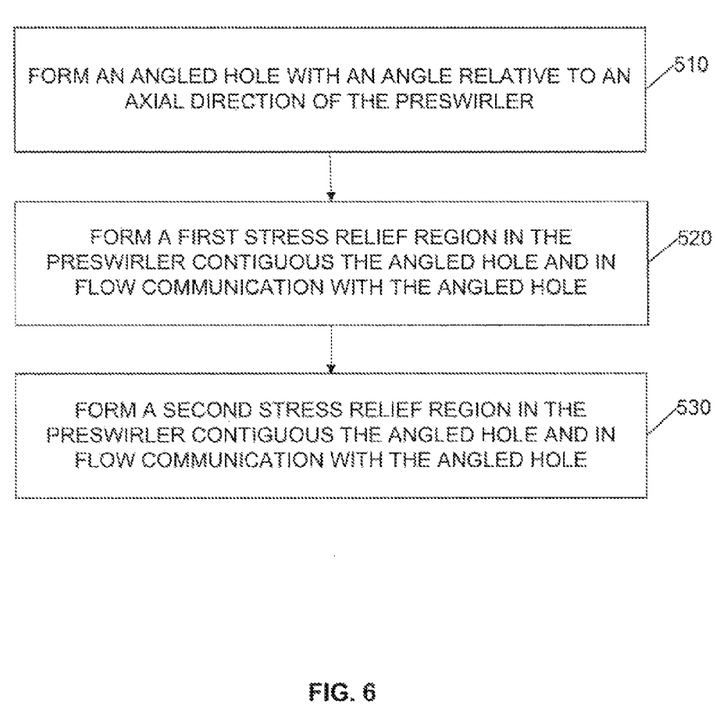
FIG. 6 is a flowchart of a method for forming cooling holes with stress relief regions in a preswirler.

FIG. 6 is a flowchart of a method for forming cooling holes with stress relief regions in a preswirler. The method includes forming an angled hole 490 relative to an axial direction 99 in the preswirler at step 510. The angled hole 490 may follow a vector which is angled in at least one plane. A component of this vector may be located on a plane perpendicular to a radial extending from the axis of the preswirler 470. Forming an angled hole 490 is followed by step 520. At step 520 a first stress relief region 491 is formed in the preswirler contiguous to the angled hole 490 and in flow communication with the angled hole 490. In one embodiment, first stress relief region 491 is formed upstream of angled hole 490. In another embodiment, first stress relief region 491 is formed downstream of angled hole 490.

Forming cooling holes with stress relief regions in a preswirler may also include forming a second stress relief region 492 in the preswirler 470 contiguous to the angled hole 490 and in flow communication with the angled hole 490 at step 530. In one embodiment, second stress relief region 492 is formed downstream of angled hole 490, opposite first stress relief region 491. In another embodiment, second stress relief region 492 is formed upstream of angled hole 490, opposite first stress relief region 491.

In one embodiment angled hole 490 is drilled into preswirler 470. In some embodiments a ball milled operation is used to form the first stress relief region 491. Some embodiments also include forming the second stress relief region 492 with a ball milled operation. At least one embodiment includes, forming eighteen angled holes 490, eighteen first stress relief regions 491, and eighteen second stress relief regions 492.

The use of a more rigid connection with angled holes 490 may lead to longer service life hours for preswirler 470 and the components in the next stage of the turbine 400 as well as an efficient use of the cooling air bled from compressor 200.

The preceding detailed description is merely exemplary in nature and is not intended to limit the invention or the application and uses of the invention. The described embodiments are not limited to use in conjunction with a particular type of gas turbine engine. Hence, although the present disclosure, for convenience of explanation, depicts and describes particular preswirlers and associated processes, it will be appreciated that other preswirlers and processes in accordance with this disclosure can be implemented in various other turbine stages, configurations, and types of machines. Furthermore, there is no intention to be bound by any theory presented in the preceding background or detailed description. It is also understood that the illustrations may include exaggerated dimensions to better illustrate the referenced items shown, and are not consider limiting unless expressly stated as such.

What is claimed is:

1. A gas turbine engine preswirler, comprising:
an outer ring; and
an inner ring having
a plurality of angled holes, each angled hole following a vector which is angled in at least one plane with a component of the vector being located on a plane perpendicular to a radial extending from an axis of the preswirler, the component of the vector being angled relative to an axial direction of the preswirler; and
a plurality of first stress relief regions, each first stress relief region being contiguous to one of the plurality of angled holes with each first stress relief region having a curved and an elongated profile, the first stress relief region being wider than a diameter of the one of the plurality of angled holes.

2. The preswirler of claim 1, wherein the inner ring further includes a plurality of second stress relief regions, each second stress relief region being contiguous to one of the plurality of angled holes with each second stress relief region having a curved and an elongated profile, the elongated profile being wider than the diameter of the angled hole.

3. The preswirler of claim 2, wherein each angled hole is configured to be in flow communication with one of the plurality of first stress relief regions and one of the plurality of second stress relief regions, and is configured to be downstream of the one of the plurality of first stress relief regions and upstream of the one of the plurality of second stress relief regions.

4. The preswirler of claim 1, wherein each angled hole is configured to be in flow communication with and downstream of one of the plurality of first stress relief regions.

5. The preswirler of claim 1, wherein each angled hole is configured to be in flow communication with and upstream of one of the plurality of first stress relief regions.

6. The preswirler of claim 1, wherein the component of the vector is angled between twenty and eighty-five degrees relative to the axial direction of the preswirler.

7. The preswirler of claim 1, further comprising:
the outer ring having
an outer flange, and
an outer cylindrical portion;
the inner ring having
an inner flange,
an inner cylindrical portion, and
a back portion;
the outer cylindrical portion and the inner cylindrical portion being spaced apart to form a radial gap; and
swirl vanes extending between the outer cylindrical portion and the inner cylindrical portion spanning across the radial gap.

8. A gas turbine engine preswirler, comprising:
an outer ring; and
an inner ring having a plurality of angled holes, each angled hole following a vector which is angled in at least one plane with a component of the vector being located on a plane perpendicular to a radial extending from an axis of the preswirler, the component of the vector being angled from sixty-five to eighty degrees relative to an axial direction of the preswirler, and a plurality of first stress relief regions, each stress relief region being contiguous to one of the plurality of angled holes with each first stress relief region having an elongated scoop shape, the elongated scoop shape being wider than a diameter of the contiguous angled hole and biased away from the contiguous angled hole along the component of the vector.

9. The preswirler of claim 8, wherein the inner ring further includes a plurality of second stress relief regions, each second stress relief region being contiguous to one of the plurality of angled holes with each second stress relief region having an elongated scoop shape, the elongated scoop shape being wider than a diameter of the contiguous angled hole and biased away from the contiguous angled hole along the component of the vector.

10. The preswirler of claim 8, wherein each first stress relief region is configured to be in flow communication with the contiguous angled hole and upstream of the contiguous angled hole.

11. The preswirler of claim 10, wherein each second stress relief region is configured to be in flow communication with the contiguous angled hole and is configured to be downstream of the contiguous angled hole.

12. The preswirler of claim 8, wherein each first stress relief region is configured to be in flow communication with contiguous angled hole and downstream of the contiguous angled hole.

13. A gas turbine engine including the preswirler of claim 8.

14. A gas turbine engine including the preswirler of claim 8, further comprising:
  a turbine rotor disk; and
  a diaphragm having
    a plurality of outer diameter holes, and
    a plurality of inner diameter holes.

15. A gas turbine engine including the preswirler of claim 8, further comprising:
  a turbine rotor disk;
  wherein the angled holes are configured to impart an angular velocity to cooling air that matches the angular velocity of the turbine rotor disk.

16. A method for forming a preswirler, the method comprising:
  forming an angled hole through the preswirler at an angle from twenty to eighty-five degrees relative to an axial direction of the preswirler;
  forming a first stress relief region contiguous the angled hole, the first stress relief region being configured to be in flow communication with the angled hole.

17. The method claim 16, further comprising forming a second stress relief region contiguous the angled hole, the second stress relief region being configured to be in flow communication with the angled hole.

18. The method of claim 16, wherein the angled hole is drilled into the preswirler.

19. The method of claim 16 wherein the first stress relief region is formed with a ball milled operation.

* * * * *